W. C. REEVES.
COTTON CLEANER.
APPLICATION FILED FEB. 24, 1919.

1,311,180.

Patented July 29, 1919.
2 SHEETS—SHEET 1.

INVENTOR
William C Reeves
BY John M Spellman
ATTORNEY

W. C. REEVES.
COTTON CLEANER.
APPLICATION FILED FEB. 24, 1919.

1,311,180.

Patented July 29, 1919.
2 SHEETS—SHEET 2.

INVENTOR.
William C. Reeves
BY John M. Spellman
ATTORNEYS.

UNITED STATES PATENT OFFICE.

WILLIAM C. REEVES, OF ELDORADO, OKLAHOMA.

COTTON-CLEANER.

1,311,180.  Specification of Letters Patent.  Patented July 29, 1919.

Application filed February 24, 1919. Serial No. 278,982.

*To all whom it may concern:*

Be it known that I, WILLIAM C. REEVES, a citizen of the United States, residing at Eldorado, in the county of Jackson and State of Oklahoma, have invented certain new and useful Improvements in Cotton-Cleaners, of which the following is a specification.

My invention relates to improvements in cotton cleaners and in such connection has particular reference to the construction and arrangement of the parts constituting such a cleaner.

Ordinarily there is employed in cleaning cotton a pneumatic arrangement whereby the cotton is drawn by means of suction through a suitable means for cleaning off the surface dirt before the cotton is ginned.

The principal object of my invention is to provide a cotton cleaner whereby seed cotton is fed by gravity into a mechanically operated hopper-like arrangement and cleaned and thence carried by a belt conveyer into the gin.

Another object of my invention is to provide a cotton cleaner which is simply constructed, strong and durable and well adapted to performing the work required.

I provide a revolving conical shaped drum around which pins are placed at suitable distances to engage the cotton, the drum being encircled by a wire screen or receptacle. As the drum revolves the cotton is caught by the pins and carried around the drum and against the screen receptacle so that the dirt is brushed off and falls between the wire mesh into a separate compartment.

My invention will be more fully understood from the following description, taken in connection with the accompanying drawings forming part hereof in which—

Figure 1:
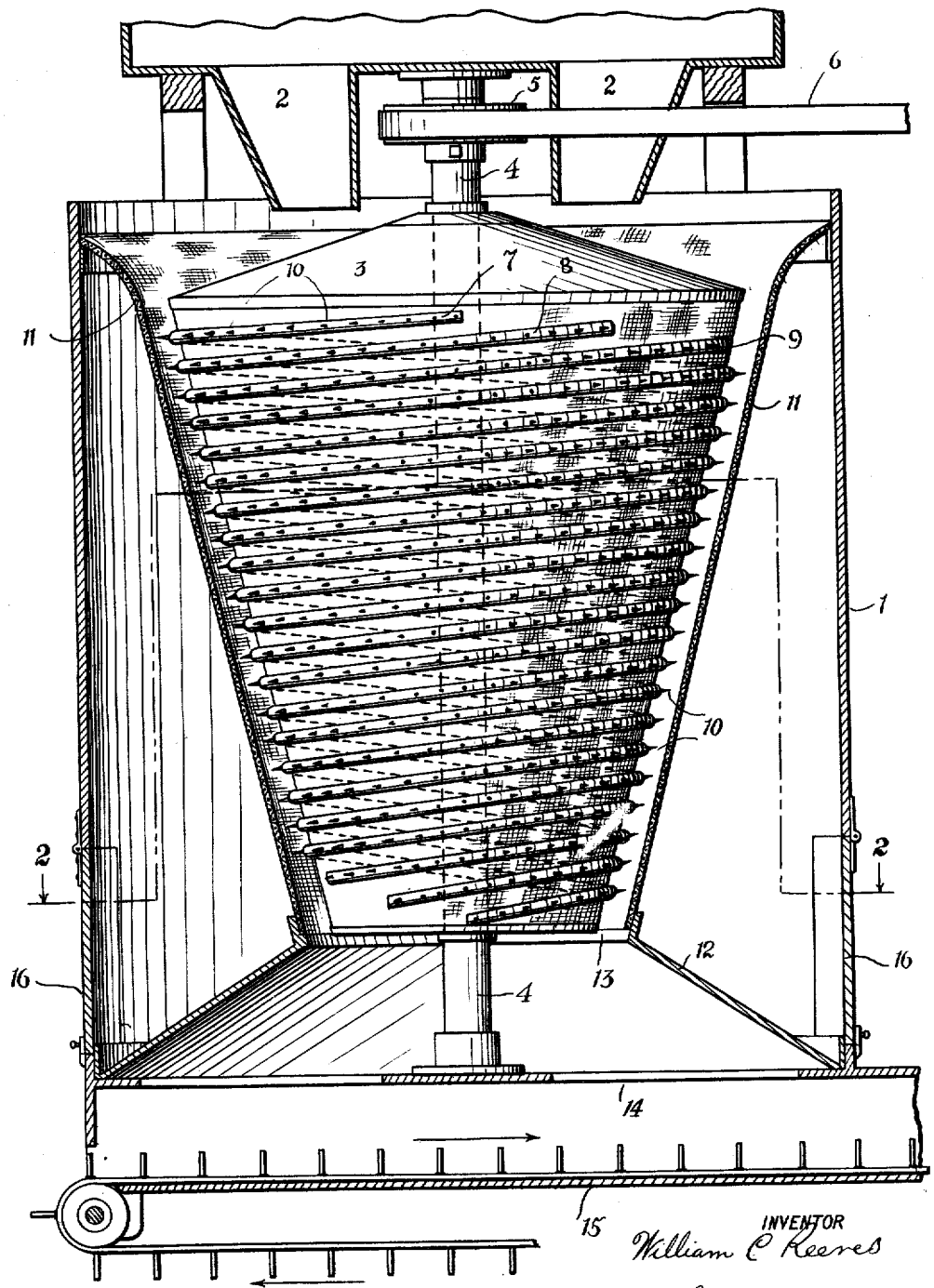
Figure 1 is a vertical sectional view of my invention the reinforcing ribs for the screen not shown.
Figure 2:
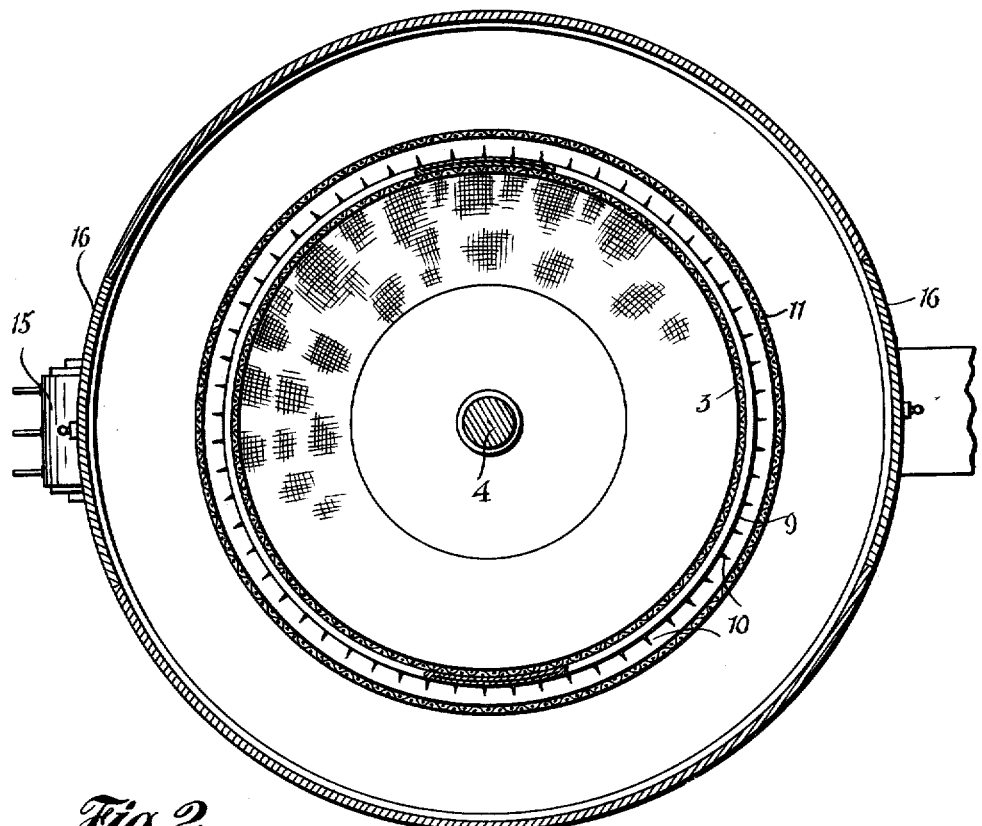
Fig. 2 is a top or plan view in cross section taken on line 2—2 of Fig. 1.
Figure 3:
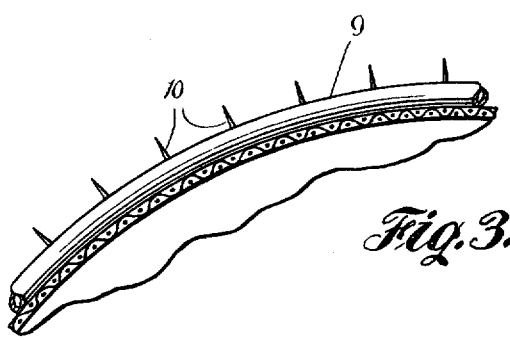
Fig. 3 is an enlarged detail sectional view of a portion of the screened drum showing how the pins are arranged.

Referring to the drawings, 1 represents the housing of my cleaner with feed chutes 2—2 through which the cotton falls by gravity onto the drum 3 which is attached to the shaft 4 and revolved by pulley and belt 5 and 6.

The drum 3 is frusto-conical shaped, the periphery of which is screened as shown and has pipes placed around it in the manner shown at Fig. 1, that is, there are a plurality, preferably three separate lengths of pipe 7, 8 and 9, each starting at a separate point on the drum and wound around the drum, each pipe terminating at the bottom of the cone in the manner shown. At suitable distances apart on the pipes are arranged the pins 10 which catch the cotton and carry it around the screened receptacle 11. Braces (not shown in the drawing) are so placed as to strengthen the screened receptacle 11 to keep it from bulging outward. This screened receptacle 11 is supported by a platform 12 open at the top and bottom as at 13 and 14 and at the bottom of the housing or casing 1 is a belt conveyer 15.

When the cotton is dropped into the chutes 2—2 it falls by gravity onto the drum 3 thence between the drum and walls of the screened receptacle 11. The drum 3 as it turns around catches the cotton on the pins or teeth 10 and the cotton is pressed against the screen, the dirt and refuse falling by gravity through the meshes of the screen onto the top of the platform 12 and is taken out at the doors 16 in the housing 1. The dirt may also fall into the drum 3 as the periphery of the drum is of screen or wire mesh. The cotton is gradually brought to the bottom of the receptacle 11 and falls through the openings 13 and 14 onto the conveyer 15 and is carried into the gin.

Having thus described the nature and objects of my invention, what I claim as new and desire to secure by Letters Patent is—

1. In a cotton cleaner, an inverted frusto-conical shaped screened drum attached to and revolving with a shaft, pipes carrying teeth on the periphery of the drum, a screened closure for said drum and a housing for said closure.

2. In a cotton cleaner, an inverted frusto-conical shaped screened drum, a shaft, pipes with teeth carried by the periphery of the drum, a screened closure for said drum, the walls of said closure parallel with the periphery of said drum, said pipes placed spirally around the drum at different starting and ending points.

3. A cotton cleaner comprising a frusto-conical screened drum mounted on a shaft, pipes carrying teeth on the periphery of said drum, a screened closure for said drum, a platform supporting said closure with openings at the bottom of said closure and a platform for the passage of the cotton to a suitable conveyer.

In testimony whereof I have signed my name to this specification.

WILLIAM C. REEVES.

Copies of this patent may be obtained for five cents each, by addressing the "Commissioner of Patents, Washington, D. C."